United States Patent [19]
Ahlqvist

[11] 3,811,478
[45] May 21, 1974

[54] TUBE WALL
[76] Inventor: Stein Alexander Marcel Ahlqvist, Sodra Kungsvagen 269, Lidingo, Sweden
[22] Filed: Nov. 11, 1971
[21] Appl. No.: 198,004

Related U.S. Application Data
[63] Continuation of Ser. No. 872,207, Oct. 29, 1969.

[52] U.S. Cl................. 138/154, 138/129, 138/132, 138/DIG. 7, 156/79, 156/143, 156/184, 156/195, 161/47, 161/48, 161/103, 161/139, 161/161
[51] Int. Cl................................................. F16l 9/16
[58] Field of Search......... 156/47, 143, 78, 79, 218, 156/184, 191, 192, 195, 139; 161/48, 47, 103, 139, 161, 179, 149; 138/114, 129, 132, 154, DIG. 7

[56] References Cited
UNITED STATES PATENTS

| | | | |
|---|---|---|---|
| 3,679,531 | 7/1972 | Wienand et al.............. | 161/139 X |
| 3,700,520 | 10/1972 | Hielema..................... | 156/195 X |
| 3,366,719 | 1/1968 | Lueders..................... | 156/79 X |
| 2,713,381 | 7/1955 | Seck......................... | 156/184 |
| 3,093,847 | 6/1963 | Strecker..................... | 161/68 X |
| 3,252,483 | 5/1966 | Swan........................ | 156/195 X |
| 3,671,348 | 6/1972 | Kemsey-Bouine............ | 156/195 X |
| 2,518,454 | 8/1950 | Elliott....................... | 156/78 X |
| 3,038,217 | 6/1962 | Harris....................... | 161/139 X |
| 3,108,852 | 10/1963 | Olsen........................ | 156/79 X |
| 3,332,814 | 7/1967 | Yoshimura et al............ | 156/79 X |

*Primary Examiner*—Clifton B. Cosby
*Attorney, Agent, or Firm*—Hane, Baxley & Spiecens

[57] ABSTRACT

A tube wall is formed by spirally winding in abutting relationship a flexible hollow strip of substantially rectangular cross-sectional outline, the outside of the wound strip constituting the outer wall of the hose and the opposite the inner wall of the hose. The strip defines therein a continuous chamber and the inside of the strip is extended to form an extension terminating in an upwardly turned lip. Each of these lips is engaged with a slot in the inside wall of the adjacent strip turn to lock the turns of the strip against axial separation. The continuous chamber in the strip is filled with a suitable hardened plastic material.

5 Claims, 4 Drawing Figures

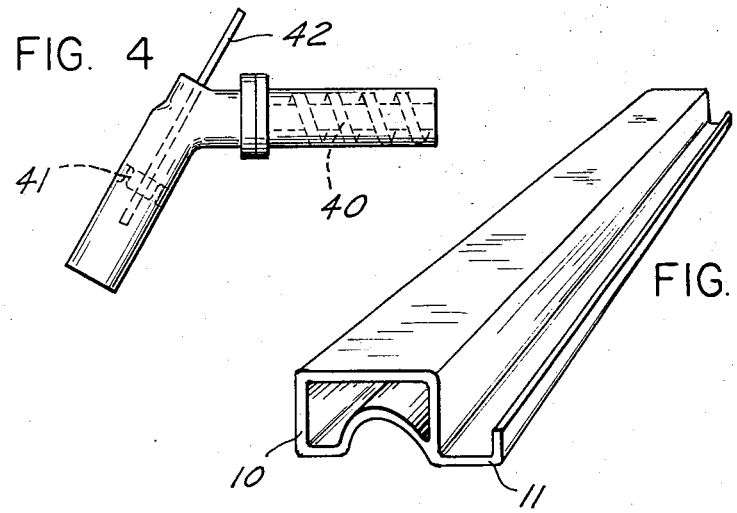
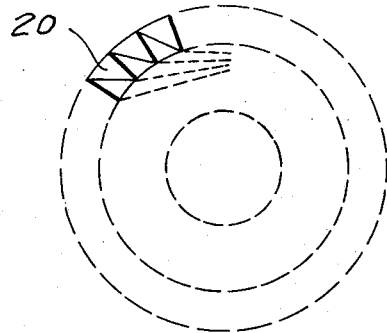
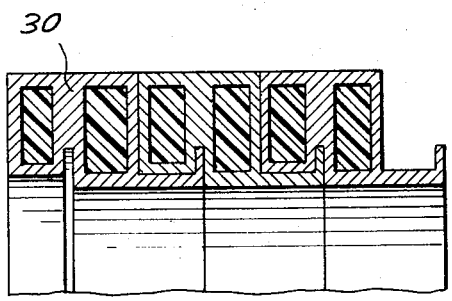

TUBE WALL

This is a continuation of application Ser. No. 872,207, filed Oct. 29, 1969.

This invention refers to a method of manufacturing tubes. The object of the invention is to manufacture a tube which is simple and cheap in manufacturing, and light but rigid in handling, transportation locating etc.

The characterizing features of this invention appear from the appended claims.

The invention will be more closely explained in connection with the appended drawing, where schematically FIG. 1 shows an example of a wall element, FIG. 2 shows a transverse section of a part of a tube, FIG. 3 shows a longitudinal section of a part of a tube and FIG. 4 shows in principle a part of a machine for manufacturing tubes in accordance with the invention.

The element according to FIG. 1 has the shape of a tube part 10 and a fastening part 11 manufactured all in one piece. This fastening part has a part with a contour (inner contour) which well fit to the contour (outer contour) of one part of the tube part 10. From the FIG. is quite clear that the left lower part of the tube part has an outer contour which well corresponds to the inner contour of the fastening part 11.

The manufacturing of a tube proceeds so that in connection with making the wall element 10 – 11 cellular plastic is introduced in the tube part of the wall element, which plastic is brought to solidify after the wall lement has been wound helically with the tube part 10 of one turn inserted in the fastening part 11 of an adjacent turn and with an adhesive put in between the tube part 10 and the fastening part 11 so that an helical joint is established consisting of the tube part, the adhesive and the fastening part. Excluding the adhesive an helical joint between the tube part and the fastening part 11 may be obtained by welding, that is the helically wound wall element is brought to pass between two heating elements. Parts 10 and 11 are separated by recess 10a and disposed at different ends.

By introducing the plastic in the tube part of the wall element after the wall element has left the extruder head, arranged for forming the wall element, it is possible to carry through the manufacturing in one single process. In the machine according to FIG. 4 the wall element is manufactured thereby that plastic is kneaded and transported by a screw 40 and then pressed through an extruder head 41 so that an element with a tube part is obtained, see for example FIG. 1. Through a feeding tube 42, which is brought through the extruder head 41 and thus ends beyond that side of the head which is turned away from the screw 40, plastic is fed to the said tube part.

As cellular plastic (foamed plastic, integral skin uretan foam) can be used thermosetting resin or thermoplast. If thermosetting resin is used, for example phenolic foamed plastic or polyurethane, the helically winding takes place immediately after the plastic is introduced. If thermoplast is used, for example polyethylene, the wall element is heated to the necessary (suitable) temperature after the plastic is introduced and the wall element is helically wound.

According to FIG. 3, the tube wall is formed by a spirally wound strip 30. This strip has a substantially rectangular cross-section disposed so that the short side 32 of the strip forms the outer wall of the tube and the short side 33 the inner wall. Side 33 is stepped at 38 and extended at one corner to form an extension 33a terminating in an upwardly turned lip 33b. The strip includes two lengthwise continuous chambers 34 and 35 separated by a lengthwise partition wall 36. A slot 37 extends from side wall 33 preferably at the step point. The length of extensions 33a, the dimensions of slot 37 and the lips 33b are so correlated that adjacent turns of the strip interlock as is clearly shown in the figure thereby preventing axial separation of the strip turns. Chambers 34 and 35 are filled with a suitable hardened plastic material 39 as previously described.

I claim:

1. A tube wall comprising a deformable box-shaped strip of substantially rectangular cross-sectional outline and defining therein a continuous chamber, said strip being helically wound with the turns of the strip in lengthwise abutting alignment to form a continuous tube wall, one side of the strip forming the outer tube wall and the strip side opposite thereto the inner tube wall, said opposite strip side being extended along its length past one of the inner corners of the strip to form a flat extension strip terminating in an upwardly turned lip and including intermediate its length a recess dividing said side into two parts, each of the lips engaging said recess in the opposite strip side of the respective adjacent turn of the strip and each of the extensions abutting with its inside surface against the juxtaposed part of said opposite strip side, and a hardened plastic material filling said chamber.

2. The tube wall according to claim 1 wherein a lengthwise partition wall extending between the inner and the outer tube wall divides said chamber into two continuous sections, each of said sections being filled with said hardened plastic material.

3. The tube wall according to claim 2 wherein each of said recesses is in the form of a slot extending from said opposite strip side into said partition wall.

4. The tube wall according to claim 3 wherein the length of said juxtaposed part of said opposite strip side matches the length of the respective extension.

5. The tube wall according to claim 3 wherein said juxtaposed part of said opposite strip side is inwardly stepped relative to the other side part by a distance such that the sides of the strip forming the outer tube wall are all flush.

* * * * *